US012566622B2

(12) United States Patent
Helvey et al.

(10) Patent No.: US 12,566,622 B2
(45) Date of Patent: Mar. 3, 2026

(54) APPLICATION EXECUTION ON A VIRTUAL SERVER BASED ON A KEY ASSIGNED TO A VIRTUAL NETWORK INTERFACE

(71) Applicant: Capital One Services, LLC, McLean, VA (US)

(72) Inventors: Eric Helvey, Alexandria, VA (US); Derek Lust, Henrico, VA (US); Mrudula Atturu, Glen Allen, VA (US); Raghavender Chekkapally, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 1393 days.

(21) Appl. No.: 17/154,724

(22) Filed: Jan. 21, 2021

(65) Prior Publication Data

US 2022/0229685 A1    Jul. 21, 2022

(51) Int. Cl.
| | |
|---|---|
| *G06F 9/455* | (2018.01) |
| *G06F 21/10* | (2013.01) |
| *G06F 21/73* | (2013.01) |
| *H04L 67/00* | (2022.01) |
| *H04L 67/51* | (2022.01) |

(52) U.S. Cl.
CPC .......... *G06F 9/45558* (2013.01); *H04L 67/34* (2013.01); *H04L 67/51* (2022.05); *G06F 2009/4557* (2013.01)

(58) Field of Classification Search
CPC ......... G06F 9/45558; G06F 2009/4557; G06F 8/60; G06F 2009/45575; G06F 9/45533; H04L 67/51; H04L 67/34; H04L 67/10
See application file for complete search history.

(56) References Cited

U.S. PATENT DOCUMENTS

| | | | | |
|---|---|---|---|---|
| 6,260,141 | B1 * | 7/2001 | Park | G06F 21/10 |
| | | | | 713/169 |
| 6,499,035 | B1 * | 12/2002 | Sobeski | G06F 21/10 |
| | | | | 707/999.102 |
| 6,804,816 | B1 * | 10/2004 | Liu | G06F 8/20 |
| | | | | 719/311 |
| 7,546,309 | B1 * | 6/2009 | Michel | G06F 9/548 |
| | | | | 707/999.102 |
| 7,596,572 | B1 * | 9/2009 | Michel | G06F 8/30 |
| 7,702,903 | B1 * | 4/2010 | Roy | G06F 21/105 |
| | | | | 380/231 |
| 7,788,677 | B1 * | 8/2010 | Michel | G06F 8/30 |
| | | | | 719/316 |

(Continued)

*Primary Examiner* — Muhammad Raza
(74) *Attorney, Agent, or Firm* — Harrity & Harrity, LLP

(57) ABSTRACT

In some implementations, a cloud computing system may deploy a virtual server to execute an application associated with an application licensor system. The cloud computing system may identify a virtual network interface that corresponds to the virtual server. The cloud computing system may associate a key received from the application licensor system to the virtual network interface to allow the application to be executed based on the virtual network interface. The cloud computing system may associate the virtual server and the virtual network interface. The cloud computing system may execute the application on the virtual server based on the key that is associated with the virtual network interface and based on associating the virtual server and the virtual network interface.

20 Claims, 8 Drawing Sheets

400

410 — Deploy a virtual server in a cloud computing system to execute an application associated with an application licensor system, wherein the cloud computing system includes a plurality of virtual servers 420 — Identify a virtual network interface that corresponds to the virtual server 430 — Associate a key received from the application licensor system to the virtual network interface to allow the application to be executed based on the virtual network interface 440 — Associate the virtual server and the virtual network interface, wherein an association between the virtual server and the virtual network interface prevents other virtual servers, of the plurality of virtual servers in the cloud computing system, from executing the application using the key 450 — Execute the application on the virtual server based on the key that is associated with the virtual network interface and based on associating the virtual server and the virtual network interface

(56)            References Cited

U.S. PATENT DOCUMENTS

|  |  |  |  |  |
|---|---|---|---|---|
| 7,849,469 | B1 * | 12/2010 | Michel | G06F 8/316 |
|  |  |  |  | 719/330 |
| 9,305,147 | B1 * | 4/2016 | Azmat | G06F 21/121 |
| 9,977,880 | B2 * | 5/2018 | Chambers | G06F 9/45533 |
| 10,412,022 | B1 * | 9/2019 | Tang | H04L 47/781 |
| 11,140,020 | B1 * | 10/2021 | Baniani | H04L 45/745 |
| 2005/0185496 | A1 * | 8/2005 | Kaler | G06F 3/068 |
|  |  |  |  | 365/230.06 |
| 2008/0098465 | A1 * | 4/2008 | Ramakrishna | G06F 21/10 |
|  |  |  |  | 726/5 |
| 2008/0319779 | A1 * | 12/2008 | Hughes | G06Q 99/00 |
|  |  |  |  | 705/310 |
| 2009/0328225 | A1 * | 12/2009 | Chambers | G06F 9/45558 |
|  |  |  |  | 718/1 |
| 2011/0131134 | A1 * | 6/2011 | Ferris | G06Q 10/087 |
|  |  |  |  | 709/224 |
| 2012/0144391 | A1 * | 6/2012 | Ueda | G06F 9/45558 |
|  |  |  |  | 718/1 |
| 2012/0166619 | A1 * | 6/2012 | Mefford, Jr. | G06F 21/10 |
|  |  |  |  | 709/224 |
| 2012/0216269 | A1 * | 8/2012 | Yeung | G06F 9/45558 |
|  |  |  |  | 726/26 |
| 2013/0263131 | A1 * | 10/2013 | Beda, III | G06F 9/50 |
|  |  |  |  | 718/1 |
| 2013/0340092 | A1 * | 12/2013 | Kamphuis | G06F 21/105 |
|  |  |  |  | 726/27 |
| 2014/0040887 | A1 * | 2/2014 | Morariu | G06F 9/44505 |
|  |  |  |  | 718/1 |
| 2014/0095286 | A1 * | 4/2014 | Drewry | G06Q 30/02 |
|  |  |  |  | 705/14.26 |
| 2015/0020069 | A1 * | 1/2015 | Patani | G06F 9/45533 |
|  |  |  |  | 718/1 |
| 2015/0268982 | A1 * | 9/2015 | Eisenmann | G06F 21/00 |
|  |  |  |  | 718/1 |
| 2015/0339144 | A1 * | 11/2015 | Cao | G06F 9/45558 |
|  |  |  |  | 718/1 |
| 2016/0055322 | A1 * | 2/2016 | Thomas | H04L 63/0876 |
|  |  |  |  | 726/7 |
| 2016/0092173 | A1 * | 3/2016 | Rodrigues | H04L 67/00 |
|  |  |  |  | 717/106 |
| 2017/0003993 | A1 * | 1/2017 | Zhou | G06F 9/45558 |
| 2017/0104789 | A1 * | 4/2017 | Cudak | H04L 63/1433 |
| 2018/0007127 | A1 * | 1/2018 | Salapura | H04L 47/783 |
| 2018/0089005 | A1 * | 3/2018 | Green | G06F 9/547 |
| 2018/0107808 | A1 * | 4/2018 | Schmitz | G06F 21/105 |
| 2018/0113999 | A1 * | 4/2018 | Azmat | G06F 21/105 |
| 2018/0137512 | A1 * | 5/2018 | Georgiadis | H04L 63/08 |
| 2018/0152503 | A1 * | 5/2018 | Holgers | H04L 67/10 |
| 2018/0173550 | A1 * | 6/2018 | Court | G06F 11/3093 |
| 2019/0004845 | A1 * | 1/2019 | Ganesan | G06F 9/5077 |
| 2019/0012208 | A1 * | 1/2019 | Ganesan | G06F 9/45558 |
| 2019/0018953 | A1 * | 1/2019 | Totale | G06F 21/53 |
| 2019/0149404 | A1 * | 5/2019 | Toews | G06F 15/00 |
|  |  |  |  | 709/220 |
| 2020/0092138 | A1 * | 3/2020 | Tillotson | H04L 12/4633 |
| 2020/0092193 | A1 * | 3/2020 | Tillotson | G06F 16/24573 |
| 2020/0092194 | A1 * | 3/2020 | Tillotson | H04L 47/2483 |
| 2020/0092201 | A1 * | 3/2020 | Tillotson | G06F 9/45558 |
| 2020/0092252 | A1 * | 3/2020 | Tillotson | H04L 61/4511 |
| 2020/0167445 | A1 * | 5/2020 | Kwon | G06F 21/6218 |
| 2020/0186600 | A1 * | 6/2020 | Dawani | H04L 67/1095 |
| 2020/0285503 | A1 * | 9/2020 | Dou | G06F 9/5072 |
| 2020/0341994 | A1 * | 10/2020 | Tamjidi | G06F 16/252 |
| 2020/0394282 | A1 * | 12/2020 | Wang | G06F 21/105 |
| 2021/0194847 | A1 * | 6/2021 | Gu | H04L 67/12 |
| 2022/0222654 | A1 * | 7/2022 | Pronski | G06Q 30/0637 |
| 2022/0222737 | A1 * | 7/2022 | Pronski | G06Q 30/0637 |

* cited by examiner

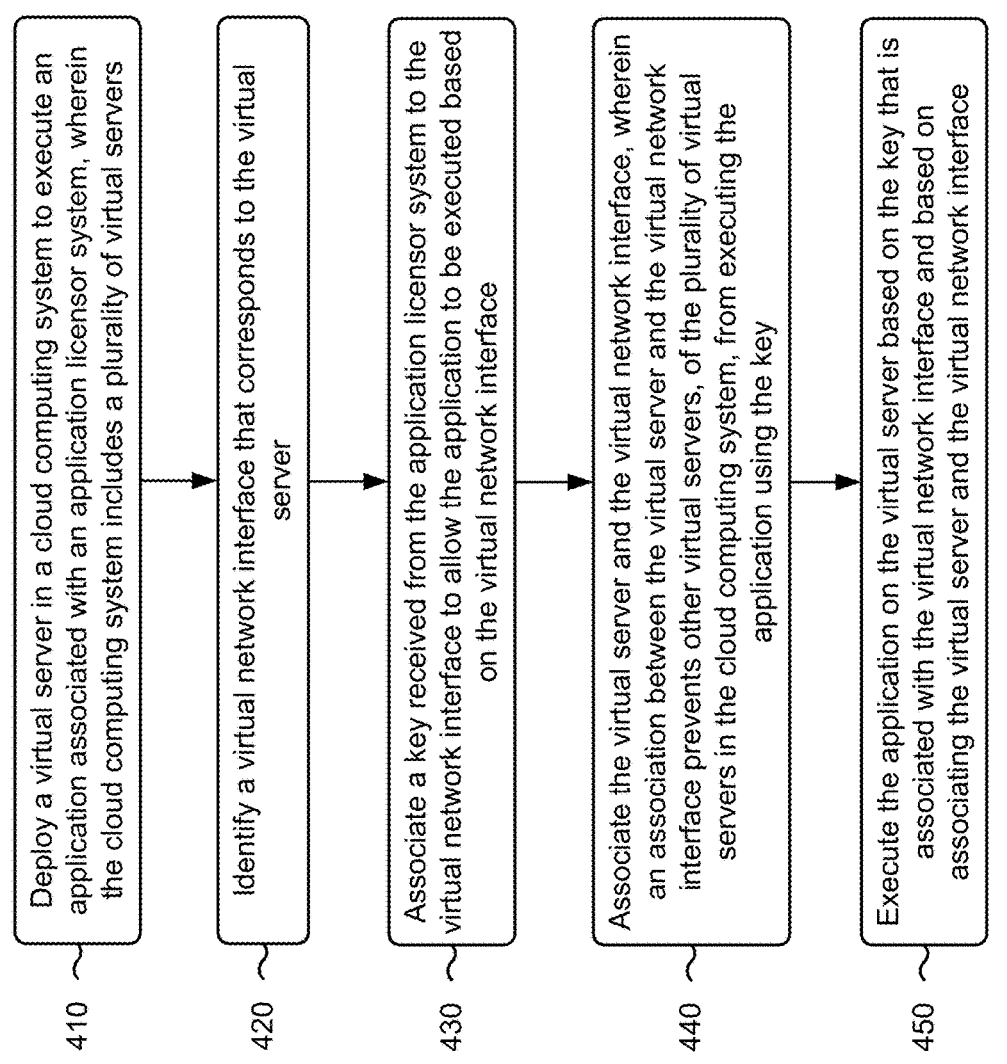

410 — Deploy a virtual server in a cloud computing system to execute an application associated with an application licensor system, wherein the cloud computing system includes a plurality of virtual servers 420 — Identify a virtual network interface that corresponds to the virtual server 430 — Associate a key received from the application licensor system to the virtual network interface to allow the application to be executed based on the virtual network interface 440 — Associate the virtual server and the virtual network interface, wherein an association between the virtual server and the virtual network interface prevents other virtual servers, of the plurality of virtual servers in the cloud computing system, from executing the application using the key 450 — Execute the application on the virtual server based on the key that is associated with the virtual network interface and based on associating the virtual server and the virtual network interface

APPLICATION EXECUTION ON A VIRTUAL SERVER BASED ON A KEY ASSIGNED TO A VIRTUAL NETWORK INTERFACE

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

SUMMARY

In some implementations, a system for executing an application on a virtual server includes one or more memories; and one or more processors, communicatively coupled to the one or more memories, configured to: receive, from a client device, a request to create a plurality of virtual network interfaces in a cloud computing system, wherein the request indicates customer accounts, geographic regions, and portions of the geographic regions to be associated with the plurality of virtual network interfaces, wherein the portions of the geographic regions correspond to sets of servers in a data center; create the plurality of virtual network interfaces in the cloud computing system based on the request, wherein the plurality of virtual network interfaces are associated with a corresponding plurality of hardware identifiers; receive, from an application licensor system, an indication that a key has been assigned to the plurality of virtual network interfaces based on the corresponding plurality of hardware identifiers; receive an instruction to deploy the virtual server in the cloud computing system to execute the application associated with the application licensor system; determine metadata associated with the virtual server, wherein the metadata indicates a customer account associated with the virtual server, a geographic region associated with the virtual server, and a portion of the geographic region associated with the virtual server; determine a virtual network interface, of the plurality of virtual network interfaces, that corresponds to the virtual server based on a correlation between the metadata associated with the virtual server and a customer account associated with the virtual network interface, a geographic region associated with the virtual network interface, and a portion of the geographic region associated with the virtual network interface; associate the virtual server with the virtual network interface based on determining that the virtual network interface corresponds to the virtual server, wherein associating the virtual server with the virtual network interface prevents one or more other virtual servers in the cloud computing system from executing the application using the key; and execute the application on the virtual server, using the key that is associated with the virtual network interface, based on associating the virtual server with the virtual network interface.

In some implementations, a method of executing an application on a virtual server includes deploying, by a cloud computing system, the virtual server in the cloud computing system to execute the application associated with an application licensor system, wherein the cloud computing system includes a plurality of virtual servers; identifying, by the cloud computing system, a virtual network interface that corresponds to the virtual server; associating, by the cloud computing system, a key received from the application licensor system to the virtual network interface to allow the application to be executed based on the virtual network interface; associating, by the cloud computing system, the virtual server and the virtual network interface, wherein an association between the virtual server and the virtual network interface prevents other virtual servers, of the plurality of virtual servers in the cloud computing system, from executing the application using the key; and executing, by the cloud computing system, the application on the virtual server based on the key that is associated with the virtual network interface and based on associating the virtual server and the virtual network interface.

In some implementations, a non-transitory computer-readable medium storing a set of instructions includes one or more instructions that, when executed by one or more processors of a device, cause the device to: create a plurality of virtual network interfaces in a cloud computing system, wherein individual virtual network interfaces are created for one or more customer accounts, one or more geographic regions, and one or more portions of the one or more geographic region; receive, from an application licensor system, an indication that a key has been assigned to the plurality of virtual network interfaces, wherein the key is assigned based on a hardware identifier associated with each of the plurality of virtual network interfaces; receive an instruction to deploy a virtual server in the cloud computing system to execute an application associated with the application licensor system; identify a virtual network interface from the plurality of virtual network interfaces that corresponds to the virtual server; associate the virtual server with the virtual network interface, wherein an association between the virtual server and the virtual network interface prevents one or more other virtual servers in the cloud computing system from executing the application using the key; and execute the application on the virtual server based on the key that is associated with the virtual network interface.

BRIEF DESCRIPTION OF THE DRAWINGS

FIG. 4 is a flowchart of an example process relating to executing an application on a virtual server based on a key assigned to a virtual network interface.

DETAILED DESCRIPTION

Figure 1A:
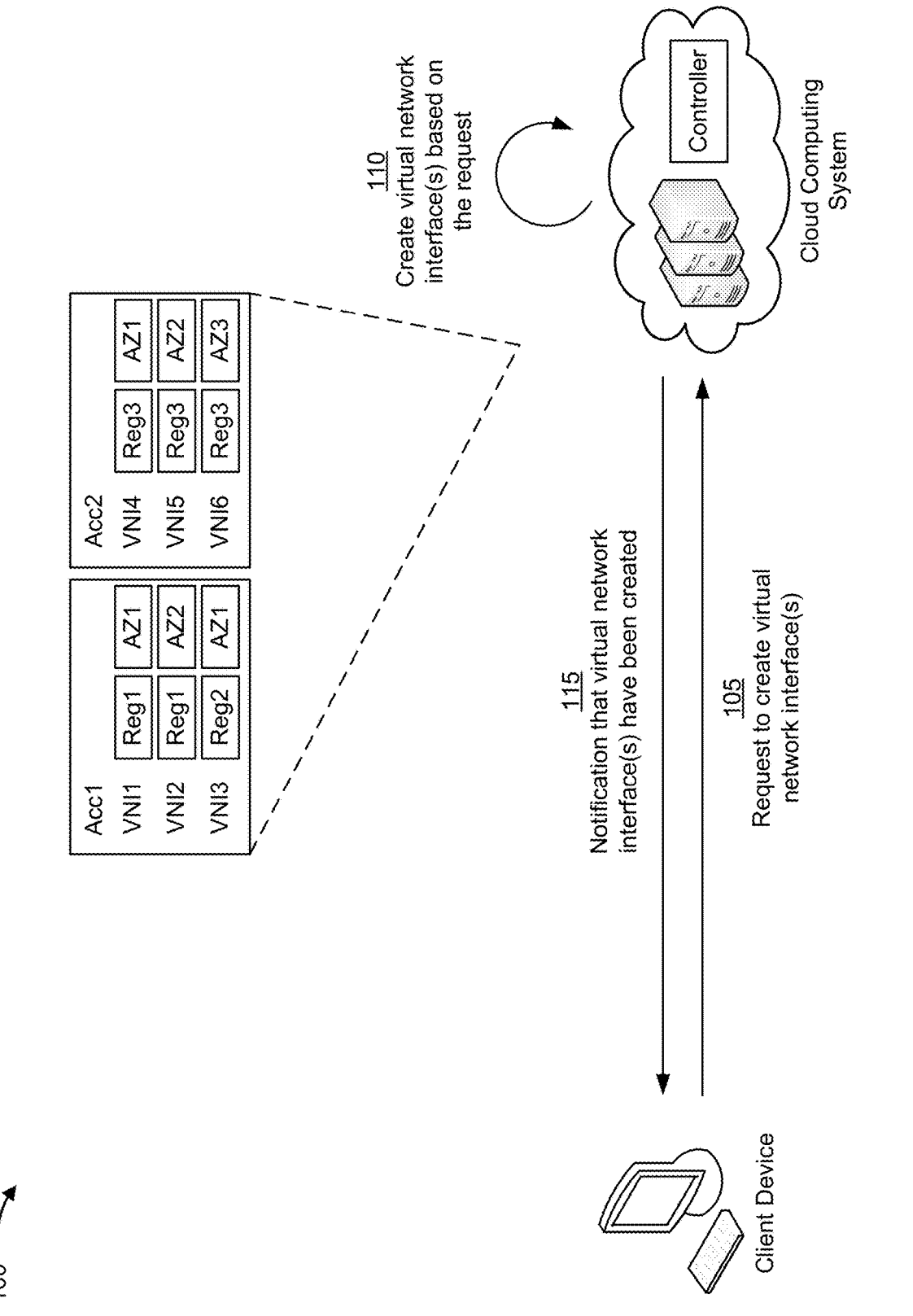
FIGS. 1A-1E are diagrams of an example implementation relating to application execution on a virtual server based on a key assigned to a virtual network interface.

The following detailed description of example implementations refers to the accompanying drawings. The same reference numbers in different drawings may identify the same or similar elements.

Applications, such as third party applications, may perform a variety of functions and/or provide various types of information. An application may be executed on a server based on a license key. The license key may authorize the application to be installed and/or executed on the server. An invalid license key or no license key may prevent the application from being installed and/or executed on the server. The license key may be associated with the application itself, and/or the license key may be associated with the server that executes the application. For example, the license key may be assigned to the server that executes the application based on a hardware identifier associated with the server. The hardware identifier may be a media access control (MAC) address, an Internet Protocol (IP) address, or any suitable identifier associated with the server.

The server may be initially configured to be able to execute the application. The server may be on-premise hardware that is physically set up and maintained by an operator. The server may be associated with the hardware identifier. The hardware identifier, such as the MAC address or the IP address, may be a static identifier associated with the server. An indication of the hardware identifier may be transmitted to an application licensor associated with the application. The application licensor may generate the license key to execute the application on the server based on the hardware identifier associated with the server. The application licensor may assign the license key to the server, and the application licensor may transmit the license key to an operator system associated with the operator of the server. The server may download, install, and execute the application based on the license key assigned to the server. In other words, the license key may allow the application to be executed on the server. The license key may continue to be valid until the license key expires after a defined duration of time, a subscription fee to maintain the license key is not paid, the hardware identifier associated with the server changes, etc.

Such applications are now often executed in a cloud computing system, which is often a transient compute environment. The cloud computing system may include virtual servers that are capable of executing the applications. The virtual servers may be launched and later shut down and relaunched in the cloud computing system. The cloud computing system may span many geographic regions, and virtual servers that are launched in a first geographic region may be shut down and relaunched in a second geographic region. A first virtual server launched in the first geographic region may be associated with a first hardware identifier (e.g., a first MAC address). The first virtual server may be shut down, and a second virtual server may be launched in a second geographic region to replace the first virtual server. However, the second virtual server may be associated with a second hardware identifier (e.g., a second MAC address). In other words, a virtual server that is shut down and relaunched, in a same geographic region or in a different geographic region, may often be associated with a different hardware identifier.

One problem with using the cloud computing system is that, when a license key is tied to a hardware identifier of a virtual server that executes an application, relaunching the virtual server as a new virtual server results in a different corresponding hardware identifier, thereby making the license key invalid for the new virtual server. In other words, since the license key is based on the hardware identifier, when the hardware identifier changes due to the virtual server being shut down and relaunched as the new virtual server, the license key becomes invalid and the application cannot execute on the new virtual server until the license key is updated for the new virtual server.

A process for updating an existing license key for a new virtual server may be similar to a process for obtaining a new license key. For example, an indication of a hardware identifier associated with the new virtual server may be transmitted to an application licensor associated with the application. The application licensor may update the license key to allow the application to be executed on the new virtual server based on the hardware identifier associated with the new virtual server. The application licensor may transmit the updated license key to an operator system associated with an operator of the new virtual server. The updated license key may be received and installed on the new virtual server. The new virtual server may install and configure the application based on the updated license key assigned to the virtual server. However, the process for updating the existing license key for the new virtual server may be time consuming. For example, the process for updating the existing license key for the new virtual server may span 24-36 hours, during which time the application is non-executable. Depending on a use case of the application (e.g., a time-sensitive application, such as a regulatory filings application), such a delay may be unacceptable for the operator that runs the application on the new virtual server. Further, virtual servers may be periodically shut down and relaunched due to refresh operations, software/hardware upgrades, etc., so repeating the process of updating the existing license key each time a new virtual server is deployed may be undesirable.

In some implementations described herein, to solve the problems described above, as well as a related technical problem of how to execute an application on different virtual servers of a cloud computing system when a license key to execute that application is valid for only an initial virtual server that executes the application, a technical solution is described herein for creating a virtual network interface in the cloud computing system, which may be associated with a virtual server. The virtual network interface may be associated with multiple virtual servers non-simultaneously, but may be associated with a single virtual server at any given time. The virtual network interface may be associated with a hardware identifier that is static. A license key may be assigned to the virtual network interface based on the hardware identifier associated with the virtual network interface. The license key may be pre-assigned to the virtual network interface rather than to the virtual server that executes an application. When a virtual server is deployed in the cloud computing system to execute the application, the virtual server may be associated with the virtual network interface that has already been assigned the license key. As a result, the application may be able to execute on the virtual server since the license key is valid for the virtual network interface associated with the virtual server.

In some implementations, when a new virtual server is launched to execute the application, the new virtual server may be associated with the virtual network interface and an old virtual server may be disassociated with the virtual network interface, which may allow the application to be executed on the new virtual server. In other words, since the license key has already been validated for the virtual network interface, the application may be able to execute on the new virtual server that is associated with the virtual network interface.

In some implementations, by creating a virtual network interface and having a license key assigned to the virtual network interface rather than to virtual servers, a virtual server that is associated with the virtual network interface may be able to execute an application associated with the license key. In other words, the license key assigned to the virtual network interface may allow the virtual server associated with the virtual network interface to execute the application. The virtual network interface may be associated with the virtual server and disassociated from the virtual server, at which point a new virtual server may be associated with the virtual network interface. The new virtual server may also be able to execute the application since the license key is assigned to the virtual network interface that is now associated with the new virtual server. As a result, virtual servers that are deployed, shut down, redeployed, etc., may continue to execute the application without updating the license key, which may allow the application to be executed near-continuously in the cloud computing system without significant delays.

FIGS. 1A-1E are diagrams of an example implementation 100 relating to application execution on a virtual server based on a key assigned to a virtual network interface. As shown in FIGS. 1A-1E, example implementation 100 includes a client device, a cloud computing system, and an application licensor system. These devices are described in more detail in connection with FIGS. 2 and 3.

As shown in FIG. 1A, and by reference number 105, the client device may transmit a request to create virtual network interfaces in the cloud computing system. The request to create the virtual network interfaces may be received at a controller of the cloud computing system.

A virtual network interface, also known as an elastic network interface (EM), is a logical network component that represents a virtual network card. The virtual network interface may be created and configured via a customer account. The customer account may be a container for virtual resources of a customer associated with the customer account. The virtual resources may be created and managed via the customer account. The virtual resources may operate in a virtual private cloud associated with the customer account. The virtual private cloud may be a virtual network dedicated to the customer account, and may be logically isolated from other virtual networks, associated with other customer accounts, in the cloud computing system.

A virtual network interface may be attached to or associated with virtual resources associated with a customer account. For example, the virtual network interface may be created via the customer account, and a virtual server may be associated with the virtual network interface. The virtual server may be a virtual resource or a computing instance. At a later time, the virtual server may be disassociated from the virtual network interface, and another virtual server may be associated with the virtual network interface. Attributes of the virtual network interface may be maintained as the virtual network interface is associated or disassociated from one virtual server to another virtual server. The attributes of the virtual network interface may include a MAC address, a private Internet Protocol version 4 (IPv4) address, an elastic IP address, a public IPv4 address, and/or an Internet Protocol version 6 (IPv6) address, among other examples of attributes.

In some implementations, the request to create the virtual network interfaces may indicate customer accounts, geographic regions, and portions of the geographic regions to be associated with the virtual network interfaces. The portions of the geographic regions may correspond to sets of servers in a data center. The request may include different combinations of the customer accounts, the geographic regions, and the portions of the geographic regions for each of the virtual network interfaces.

The cloud computing system may be associated with a plurality of geographic regions. A geographic region is a physical location associated with a cluster of data centers. A portion of the geographic region may be referred to as an availability zone (AZ), and may correspond to a group of logical data centers. A geographic region of the cloud computing system may include multiple, isolated, and physically separate portions (or availability zones) within the geographic region. A portion of the geographic region may have independent power, cooling, and physical security and may be connected via redundant, ultra-low-latency networks. In other words, a portion of the geographic region may refer to one or more discrete data centers with redundant power, networking, and connectivity to a geographic region of the cloud computing system.

As an example, the request may include a first combination of a first customer account (Acc1), a first geographic region (Reg1), and a first portion of the first geographic region (AZ1), to be associated with a first virtual network interface (VNI1). The request may include a second combination of a first customer account (Acc1), a first geographic region (Reg1), and a second portion of the first geographic region (AZ2), to be associated with a second virtual network interface (VNI2). The request may include a third combination of a first customer account (Acc1), a second geographic region (Reg2), and a first portion of the second geographic region (AZ1), to be associated with a third virtual network interface (VNI3).

The request may include a fourth combination of a second customer account (Acc2), a third geographic region (Reg3), and a first portion of the third geographic region (AZ1), to be associated with a fourth virtual network interface (VNI4). The request may include a fifth combination of a second customer account (Acc2), a third geographic region (Reg3), and a second portion of the third geographic region (AZ2), to be associated with a fifth virtual network interface (VNI5). The request may include a sixth combination of a second customer account (Acc2), a third geographic region (Reg3), and a third portion of the third geographic region (AZ3), to be associated with a sixth virtual network interface (VNI6). In some instances, the first customer account and the second customer account may be associated with the same customer.

As an example, the cloud computing system may create a virtual network interface for every combination of customer account, geographic region, and portion of geographic region for a given customer. As a result, regardless of the geographic region and portion of the geographic region in which a virtual server is deployed for the customer, a virtual network interface may be available to be associated with the virtual server.

As shown by reference number 110, the cloud computing system may create the virtual network interfaces. The cloud computing system, via the controller, may create the virtual network interfaces based on the request received from the client device. The cloud computing system may create the virtual network interfaces from a list of available virtual network interfaces. The cloud computing system may create the virtual network interfaces based on a hash of a customer account identifier, a hash of a geographic region identifier, and/or a hash of a portion of the geographic region identifier (e.g., an AZ identifier). The cloud computing system may create virtual network interfaces associated with the combinations of customer accounts, geographic regions, and portions of the geographic regions, as indicated in the request received from the client device. The virtual network interfaces may be associated with the customer account. For example, the virtual network interfaces may be created and stored in the customer account. The virtual network interfaces may be associated with corresponding hardware identifiers (e.g., MAC addresses, IP addresses, among other examples). For example, each of the created virtual network interfaces may be associated with a unique hardware identifier.

As an example, the cloud computing system may create, based on the request, VNI1 corresponding to Acc1, Reg1, and AZ1. The cloud computing system may create, based on the request, VNI2 corresponding to Acc1, Reg1, and AZ2. The cloud computing system may create, based on the request, VNI3 corresponding to Acc1, Reg2, and AZ1. The cloud computing system may create, based on the request, VNI4 corresponding to Acc2, Reg3, and AZ1. The cloud computing system may create, based on the request, VNI5 corresponding to Acc2, Reg3, and AZ2. The cloud computing system may create, based on the request, VNI6 corresponding to Acc2, Reg3, and AZ3.

As shown by reference number 115, the cloud computing system may transmit a notification to the client device to indicate that the virtual network interfaces have been created for the combinations of customer accounts, geographic regions, and portions of the geographic regions. The client device (e.g., via a user interface of the client device) may display the notification to the customer associated with the customer account to notify the customer that the virtual network interfaces have been created. Further, the notification may include a listing of the virtual network interfaces that were created.

Figure 1B:
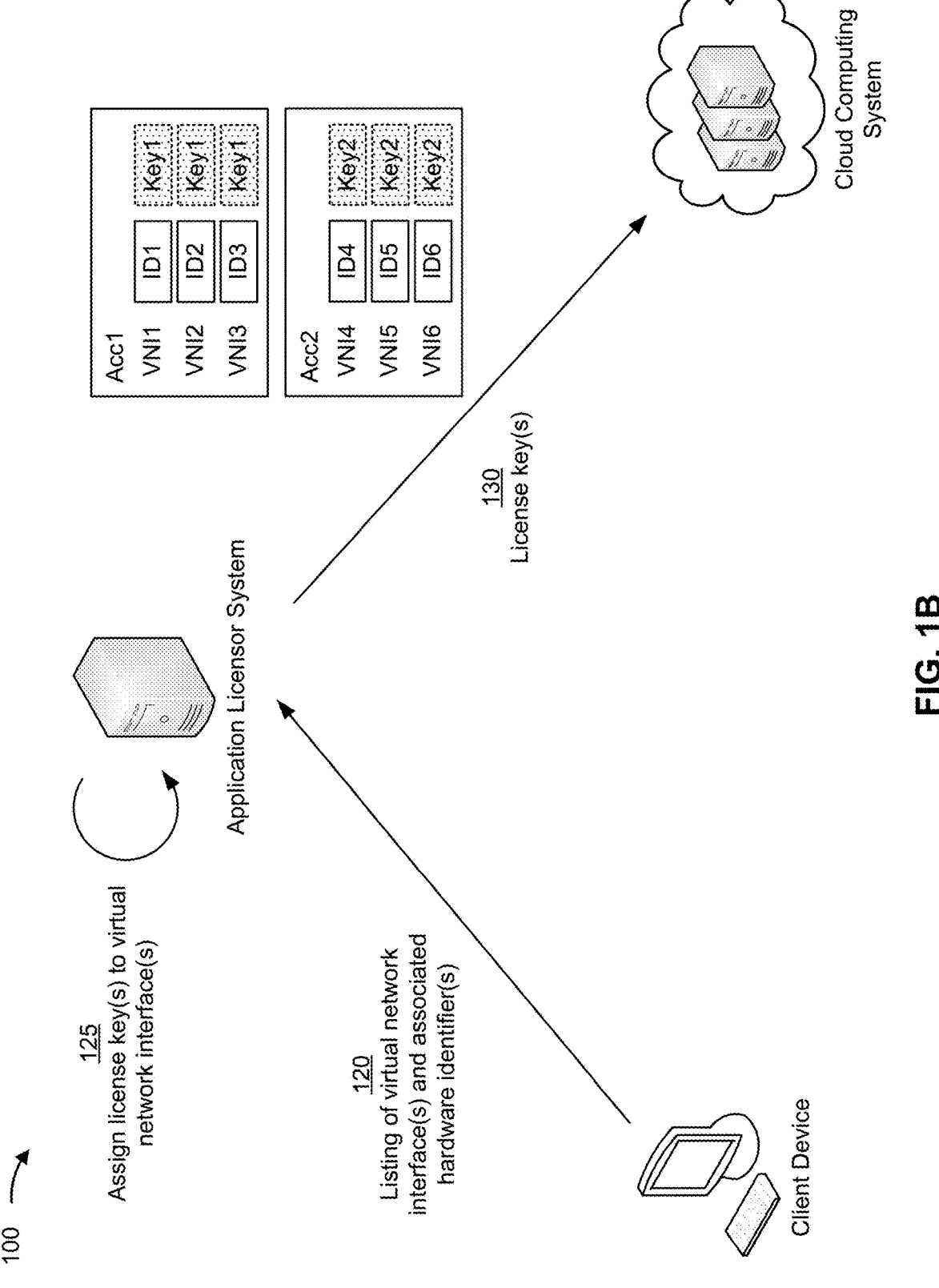

As shown in FIG. 1B, and by reference number 120, the client device may transmit the listing of virtual network interfaces and corresponding hardware identifiers to an application licensor system. The hardware identifiers may be MAC addresses, static IP addresses, etc. associated with the virtual network interfaces. The listing may indicate, for each virtual network interface, a corresponding hardware identifier.

As shown by reference number 125, the application licensor system may assign license key(s) to the virtual network interfaces. The application licensor system may assign the license keys to the virtual network interfaces based on the hardware identifiers associated with the virtual network interfaces. In other words, the license keys may be generated based on the hardware identifiers of the virtual network interfaces. The license keys that are associated with the virtual network interfaces may be independent of hardware identifiers associated with virtual servers that are configured to execute an application associated with the application licensor system. The license keys may be valid for a lifespan of the virtual network interfaces, a defined duration (e.g., one year) of the virtual network interfaces, etc.

In some implementations, each of the virtual network interfaces may be assigned a single license key. A same license key may be assigned to all of the virtual network interfaces, or alternatively, multiple license keys may be assigned for the virtual network interfaces. For example, a first license key may be assigned to a first virtual network interface or a first group of the virtual network interfaces, a second license key may be assigned to a second virtual network interface or a second group of the virtual network interfaces, and so on.

As an example, the application licensor system may assign a first license key (Key1) to VNI1 associated with a first hardware identifier (ID1). The application licensor system may assign the first license key (Key1) to VNI2 associated with a second hardware identifier (ID2). The application licensor system may assign the first license key (Key1) to VNI3 associated with a third hardware identifier (ID3). The application licensor system may assign a second license key (Key2) to VNI4 associated with a fourth hardware identifier (ID4). The application licensor system may assign the second license key (Key2) to VNI5 associated with a fifth hardware identifier (ID5). The application licensor system may assign the second license key (Key2) to VNI6 associated with a sixth hardware identifier (ID6).

As shown by reference number 130, the application licensor system may transmit, to the cloud computing system, the license key(s) that have been assigned to the virtual network interfaces. The license key(s) may be stored in association with identifiers of the virtual network interfaces in the customer account. As described above, the license key(s) may be based on hardware identifiers corresponding to the virtual network interfaces. The license key(s) may enable an application associated with the application licensor system to be installed, configured, and/or executed in the cloud computing system.

In some implementations, the application licensor system may transmit, to the client device, an indication that the license key(s) have been assigned to the virtual network interfaces. The client device (e.g., via the user interface of the client device) may display the indication to the customer associated with the customer account to notify the customer that the license key(s) have been assigned to the virtual network interfaces. Further, the notification may include the license key(s) that have been assigned to the virtual network interfaces.

Figure 1C:
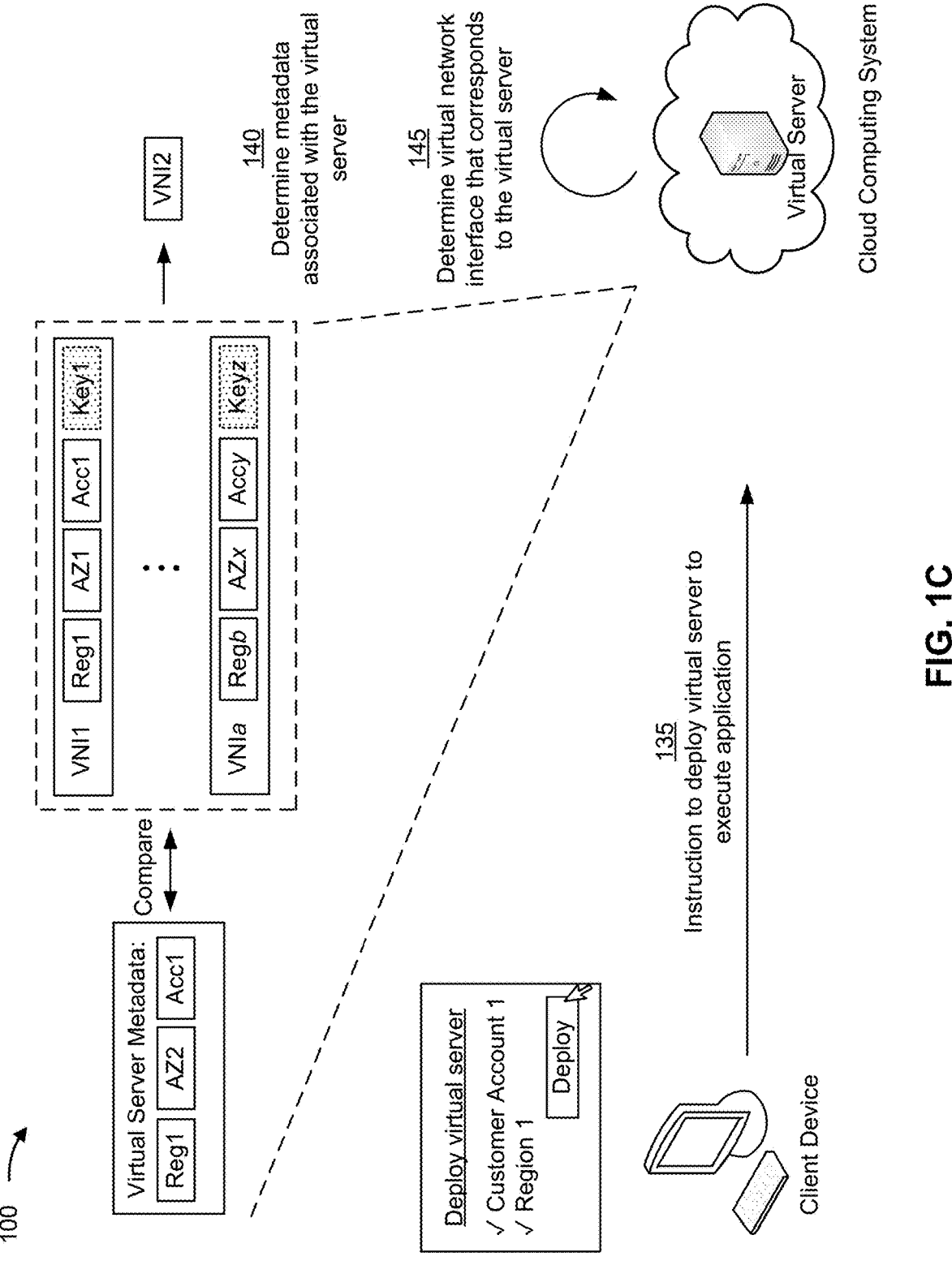

As shown in FIG. 1C, and by reference number 135, the cloud computing system may receive, from the client device, an instruction to deploy a virtual server in the cloud computing system to execute the application associated with the application licensor system. The cloud computing system may deploy or launch the virtual server in the cloud computing system based on the instruction received from the client device. The instruction may indicate a geographic region in which the virtual server is to be deployed, and the cloud computing system may deploy the virtual server in the geographic region indicated in the instruction. However, in some instances, the instruction may not indicate a portion of the geographic region in which the virtual server is to be deployed, so the cloud computing system may select one of the portions of the geographic region to deploy the virtual server. The cloud computing system may randomly select one of the portions of the geographic regions, or the cloud computing system may select one of the portions of the geographic regions based on a current load in geographic regions of the cloud computing system.

As an example, the client device may generate the instruction to transmit to the cloud computing system based on a command received, via the user interface of the client device, to deploy the virtual server. The command may be received, via the user interface, based on input from the customer that is interacting with the user interface. The command may indicate the customer account associated with the virtual server to be deployed, and the geographic region in which the virtual server is to be deployed. The command may not indicate the portion of the geographic region in which the virtual server is to be deployed.

As shown by reference number 140, the virtual server deployed in the cloud computing system may identify metadata associated with the virtual server. The metadata may be created and associated with the virtual server based on the virtual server being deployed in the cloud computing system. The metadata may indicate a customer account associated with the virtual server, a geographic region associated with the virtual server, and a portion of the geographic region associated with the virtual server. In other words, based on the metadata, the virtual server may determine the customer account that is associated with the virtual server, the geographic region that is associated with the virtual server, and the portion of the geographic region that is associated with the virtual server.

As shown by reference number 145, the virtual server may determine a virtual network interface, of the virtual network interfaces created by the cloud computing system for the customer account, that corresponds to the virtual server deployed in the cloud computing system. The virtual server may identify the virtual network interface based on a correlation between the metadata associated with the virtual server and a customer account associated with the virtual network interface, a geographic region associated with the virtual network interface, and a portion of the geographic region associated with the virtual network interface. In other words, the virtual server may identify the virtual network interface based on a correlation between the customer account associated with the virtual server, the geographic region associated with the virtual server, and the portion of the geographic region associated with the virtual server, as indicated by the metadata, and the customer account associated with the virtual network interface, the geographic region associated with the virtual network interface, and the portion of the geographic region associated with the virtual network interface.

In some implementations, the virtual server may transmit, to a data retrieval service that operates in the cloud computing system, a query that indicates the metadata associated with the virtual server. The metadata may indicate the customer account associated with the virtual server, the geographic region associated with the virtual server, and the portion of the geographic region associated with the virtual server. The data retrieval service may compare the metadata to a listing of virtual network interfaces with corresponding geographic regions, portions of geographic regions, customer accounts, and license keys. The listing may be stored in a storage device that is accessible to the data retrieval service. The virtual server may receive, from the data retrieval service, a query response indicating that the virtual network interface corresponds to the virtual server based on the correlation between the metadata associated with the virtual server and the customer account associated with the virtual network interface, the geographic region associated with the virtual network interface, and the portion of the geographic region associated with the virtual network interface.

As an example, the virtual server may transmit metadata indicating that the virtual server has been deployed in Reg1 and AZ2, and that the virtual server is associated with Acc1. The data retrieval service may compare the metadata to a listing of virtual network interfaces (VNIa) with corresponding geographic regions (Regb), portions of geographic regions (AZx), customer accounts (Accy), and license keys (Keyz). The data retrieval may determine, based on the comparison, that VNI2 corresponds to the metadata (e.g., Reg1, AZ2, and Acc1) associated with the virtual server. The data retrieval service may transmit, to the virtual server, a query response indicating that VNI2 corresponds to the virtual server. The virtual server may determine, based on the query response, that the virtual server has been deployed in Reg1 and AZ2, and is associated with Acc1, and that VNI2 has been already pre-created for that combination of geographic region, portion of geographic region, and customer account.

Figure 1D:
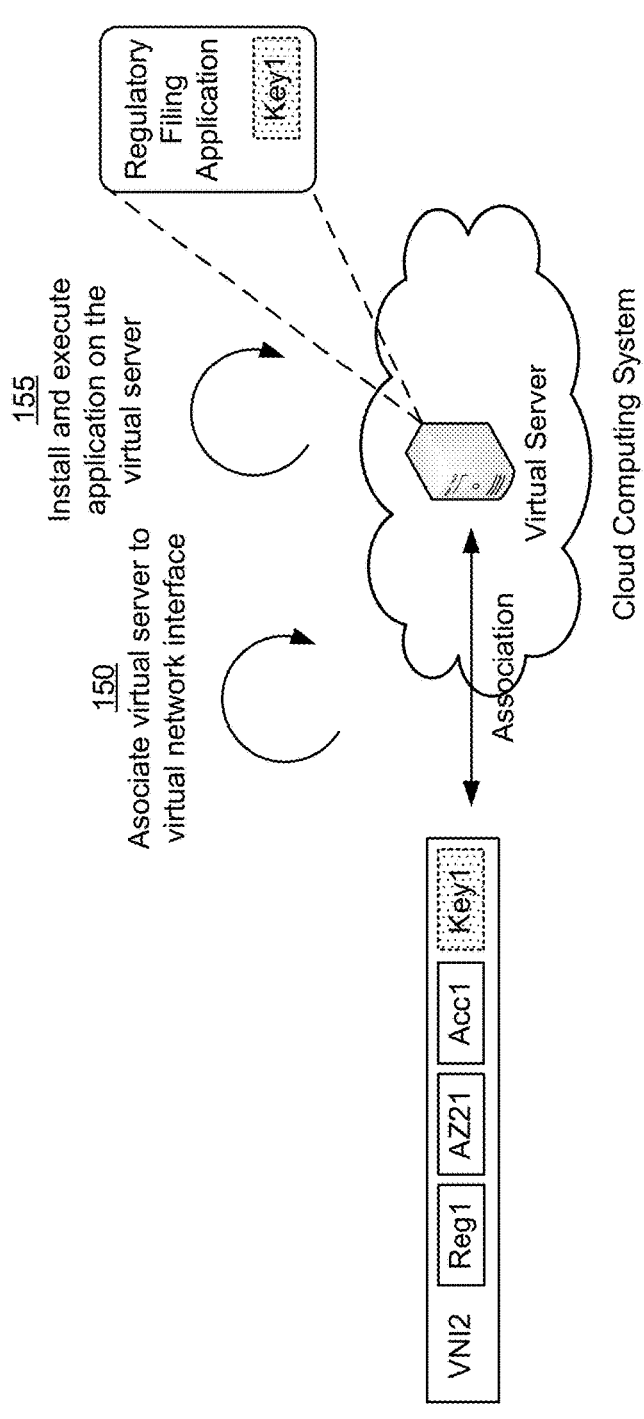

As shown in FIG. 1D, and by reference number 150, the virtual server may be associated with the virtual network interface. For example, the virtual server may use an application programming interface (API) of the cloud computing system to associate itself with the virtual network interface. The virtual server may be associated with the virtual network interface based on the determination that the virtual network interface corresponds to the virtual server. An association between the virtual server and the virtual network interface may be indicated in the customer account. One property of the virtual network interface is an ability to be associated with or attached to one virtual server at a time. The virtual server may be the only virtual server associated with the virtual network interface at a given time. In other words, the virtual server may not be associated with the virtual network interface along with one or more other virtual servers at a same time.

In some implementations, by associating the virtual server with the virtual network interface, the license key assigned to the virtual network interface may be accessible to the virtual server. In other words, by associating the virtual server with the virtual network interface, the virtual server may benefit from the license key that has been assigned to the virtual network interface.

As an example, VNI2 may be associated with a virtual server deployed in Reg1 and AZ1, and that is associated with Acc1. Key1 may be assigned to VNI2. By associating VNI2 and the virtual server, Key1 may be useable by the virtual server.

As shown by reference number 155, the virtual server may download the application associated with the application licensor system, and/or initiate an installation of the application. The application may be used for a variety of use cases, such as time-sensitive use cases like regulatory filings. During the installation of the application, the application may check whether a license key is present and/or whether a present license key is valid and not expired. The application may compare the license key to a list of valid license keys to determine whether the license key is valid. Without the valid license key, the installation and/or execution of the application on the virtual server may not proceed. The application may determine whether the license key has been assigned to the virtual network interface associated with the virtual server. For example, the application may initially check if the license key has been assigned to the virtual server, and if no license key is found, the application may check if the virtual network interface associated with the virtual server has been assigned the license key. The application may identify the license key assigned to the virtual network interface and verify that the license key is valid based on accessing the list of valid license keys, which may allow the virtual server to finish the installation and then execute the application on the virtual server. The virtual server may execute the application based on the license key assigned to the virtual network interface associated with the virtual server.

In some implementations, associating the virtual server with the virtual network interface may prevent other virtual servers in the cloud computing system from being associated with the virtual network interface at a same time and executing the application using the license key. In other words, the license key assigned to the virtual network interface may be used to execute a single application at a time, since the virtual network interface may not simultaneously be associated with multiple virtual servers executing corresponding applications.

As an example, the virtual server may download and initiate an installation of a regulatory filing application. The regulatory filing application is permitted to be installed and/or executed on the virtual server based on a license key assigned by an application licensor system associated with the regulatory filing application. The regulatory filing application may determine, during the installation, that Key1 has been assigned to VNI2, which is associated with the virtual server that is attempting to install the regulatory filing application. The regulatory filing application may verify that Key1 is valid, which may result in the regulatory filing application being successfully installed and executed on the virtual server. Therefore, Key1 may be useable by the virtual server to install and execute the regulatory filing application.

Figure 1E:
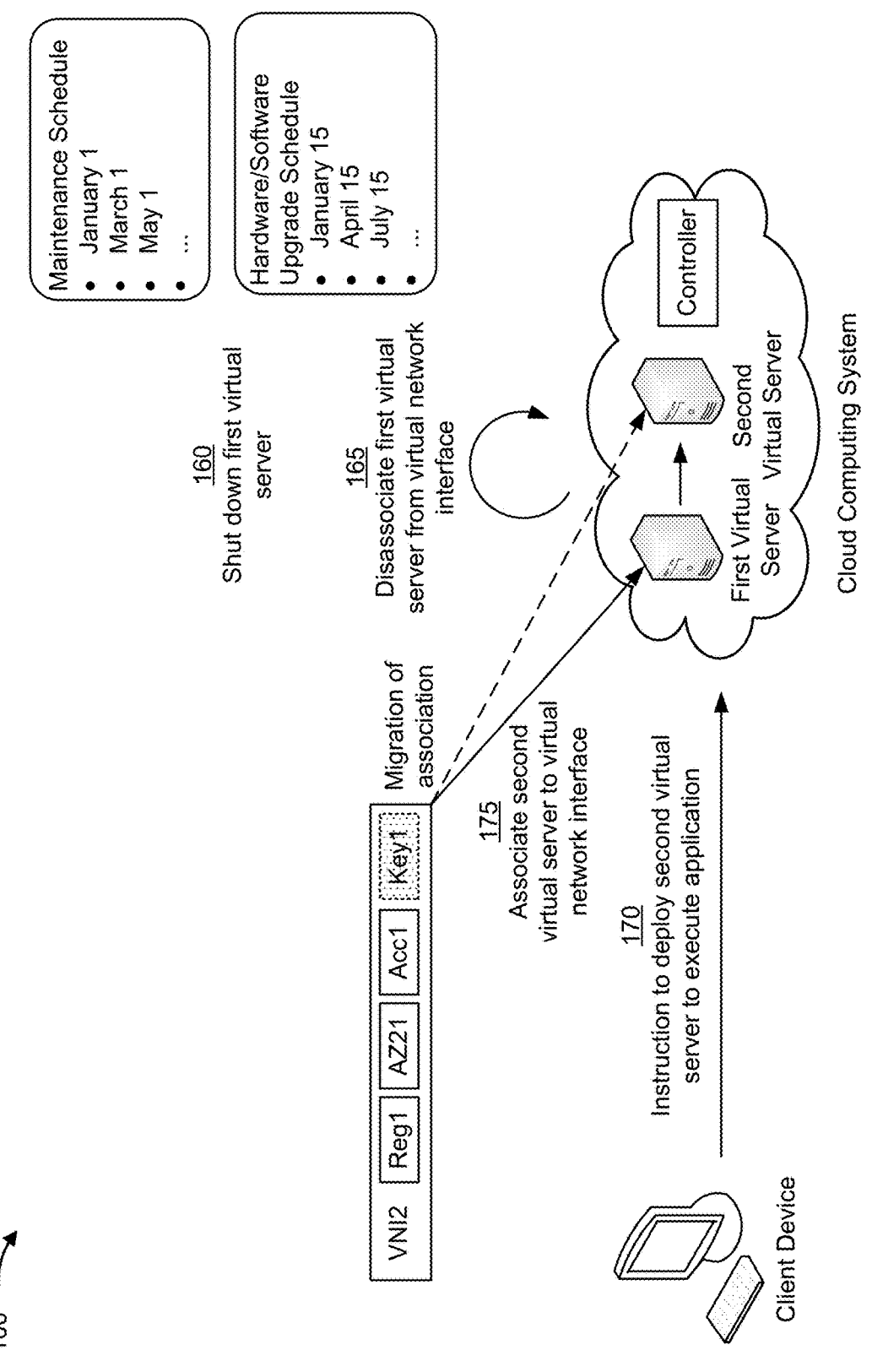

As shown in FIG. 1E, and by reference number 160, the virtual server may be a first virtual server, and the controller in the cloud computing system may initiate a shutdown of the first virtual server. In some implementations, the controller may initiate the shutdown of the first virtual server based on a periodic refresh of the first virtual server. For example, the controller may maintain a maintenance schedule associated with the first virtual server, which may indicate a time at which a periodic refresh of the first virtual server is due. In some implementations, the controller may initiate the shutdown of the first virtual server based on a hardware upgrade and/or software upgrade of the first virtual server. The hardware upgrade and/or software upgrade may be associated with a predefined upgrade schedule. Alternatively, the controller may receive a notification of a non-periodic hardware upgrade and/or software upgrade that is available for the first virtual server, and the controller may initiate the shutdown of the first virtual server based on the notification. In some implementations, the controller may initiate the shutdown of the first virtual server based on a performance metric of the virtual server. For example, the controller may initiate the shutdown of the first virtual server when the performance metric fails to satisfy a threshold.

As shown by reference number 165, the first virtual server may be disassociated from the virtual network interface based on the shutdown of the first virtual server. At a point in time at which the first virtual server is disassociated from the virtual network interface, the virtual network interface may not be associated with any virtual server. The disassociation of the first virtual server from the virtual network interface may not affect the license key that is assigned to the virtual network interface, since the assignment of the license key to the virtual network interface is irrespective of any virtual servers that are associated with the virtual network interface. The disassociation between the virtual server and the virtual network interface may be indicated in the customer account.

As shown by reference number 170, the cloud computing system may receive, from the client device, an instruction to deploy a second virtual server in the cloud computing system to execute the application associated with the application licensor system. The cloud computing system may deploy or launch the second virtual server in the cloud computing system based on the instruction received from the client device. The instruction may indicate a geographic region in which the second virtual server is to be deployed, and the cloud computing system may deploy the second virtual server in the geographic region indicated in the instruction. In some instances, the instruction may not indicate a portion of the geographic region in which the second virtual server is to be deployed, so the cloud computing system may select one of the portions of the geographic region to deploy the second virtual server.

In some implementations, the controller in the cloud computing system may automatically deploy the second virtual server based on the shutdown of the first virtual server. In this case, the cloud computing system may not receive the instruction from the client device to deploy the second virtual server. Rather, the controller in the cloud computing system may detect that the first virtual server has been shut down due to the maintenance, periodic update, hardware/software upgrade, etc., and the controller in the cloud computing system may automatically deploy the second virtual server. In some implementations, a setting to automatically deploy the second virtual server may be configured via the customer account, which may minimize a down time of an execution of the application in between deployments of virtual servers.

As shown by reference number 175, the second virtual server may be associated with the virtual network interface that was previously associated with the first virtual server. The second virtual server may be associated with the virtual network interface based on the second virtual server being deployed in the geographic region and the portion of the geographic region associated with the virtual network interface, and based on the second virtual server being deployed using the customer account associated with the virtual network interface. In other words, based on the first virtual server and the second virtual server being deployed in a same geographic region, in a same portion of the same geographic region, and being associated with a same customer account, the virtual network interface that was previously associated with the first virtual server may now become associated with the second virtual server. An association between the second virtual server and the virtual network interface may be indicated in the customer account.

In some implementations, the second virtual server may install and/or execute the application based on the license key assigned to the virtual network interface associated with the second virtual server. In other words, the application that was previously executed on the first virtual server based on the license key assigned to the virtual network interface may now be executed on the second virtual server based on the license key assigned to the virtual network interface, since the virtual network interface is common to both the first virtual server and the second virtual server.

In some implementations, the first virtual server may execute the application based on the license key associated with the virtual network interface. The second virtual server may execute, after the first virtual server is shut down, the application based on the license key associated with the virtual network interface. The first virtual server is associated with a first hardware identifier and the second virtual server is associated with a second hardware identifier. The license key assigned to the virtual network interface may be based on a third hardware identifier associated with the virtual interface, and is different than the first hardware identifier and the second hardware identifier.

As an example, the first virtual server may be associated with VNI2. At some point in time, the first virtual server may be shut down, for example, due to maintenance, a periodic refresh, an upgrade, etc. The first virtual server may be disassociated from VNI2. The second virtual server may be deployed in the cloud computing system. When the second virtual server is associated with a same geographic region, a same portion of the same geographic region, and a same customer account as compared to the first virtual server, VNI2 may be associated with the second virtual server.

In some implementations, the second virtual server may associate with a different virtual network interface. For example, the virtual network interface associated with the first virtual server may be a first virtual network interface, and the second virtual server may be associated with a second virtual network interface. In this case, the first virtual server and the second virtual server may be deployed in different geographic regions, different portions of a same geographic region, and/or may be associated with different customer accounts. The second virtual server may determine, based on metadata associated with the second virtual server, a geographic region, a portion of the geographic region, and a customer account associated with the second virtual server. The second virtual server may determine, based on a query-response exchange with the data retrieval service, that the second virtual network interface corresponds to the second virtual server. In other words, the second virtual server may identify the second virtual network interface as already being created for the combination of geographic region, portion of geographic region, and customer account of the second virtual server. The second virtual network interface may be assigned a same license key as the first virtual network interface, or a different license key as compared to the first virtual network interface.

In some implementations, the application may be executed on a virtual server based on a license key assigned to a virtual network interface associated with the virtual server, rather than a license key that is assigned to the virtual server that executes the application. As a result, the license key remains valid for a lifespan of the virtual network interface. Different virtual servers may become associated and disassociated with the virtual network interface over time, but as long as the license key is valid for the virtual network interface, the virtual server that is associated with the virtual network interface may be permitted to execute the application. In situations in which application licensing is tied to a hardware identifier, assigning the license key to a static hardware identifier of the virtual network interface may be advantageous, since hardware identifiers of the virtual servers that execute the application often change due to the transient properties of the cloud computing system but the static hardware identifier of the virtual network interface remains constant.

Further, by pre-creating virtual network interfaces for every combination of geographic region, portion of geographic region, and customer account, and by assigning a license key for each of the combinations, regardless of a geographic region, portion of geographic region, and customer account associated with a deployed virtual server, the deployed virtual server may be associated with one virtual network interface and a corresponding license key. As a result, the application may be permitted to be executed on the deployed virtual server in a timely manner.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
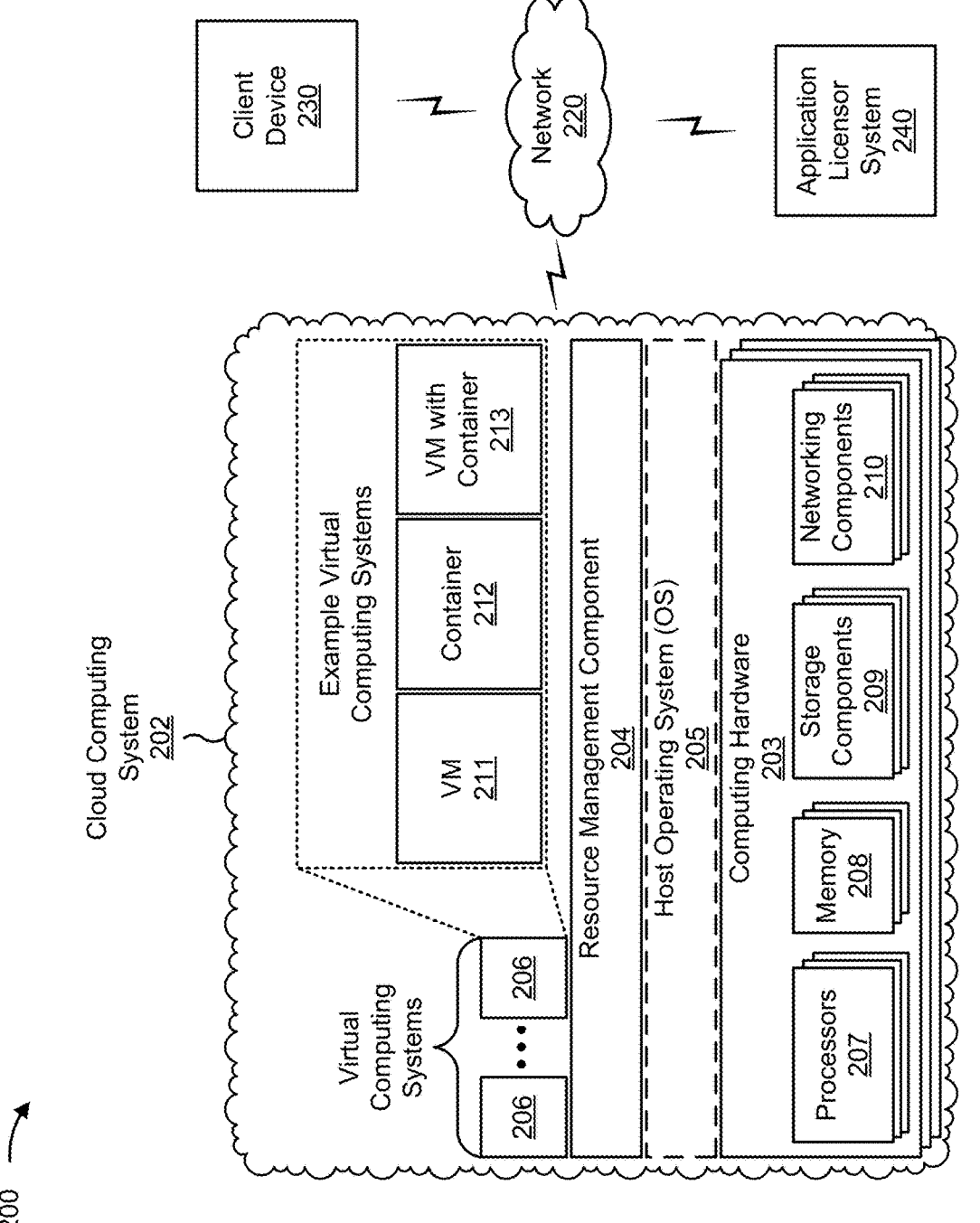
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a cloud computing system 202. The cloud computing system 202 may include one or more elements 203-213, as described in more detail below. As further shown in FIG. 2, environment 200 may include a client device 220, an application licensor system, and/or a network 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211.

Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the cloud computing system 202 may include one or more elements 203-213, which may execute within the cloud computing system 202, and/or may be hosted within the cloud computing system 202, in some implementations, the cloud computing system 202 may not be cloud-based (e.g., may be implemented outside of a cloud computing system) or may be partially cloud-based. For example, the cloud computing system 202 may include one or more devices, such as device 300 of FIG. 3, which may include a standalone server or another type of computing device. The cloud computing system 202 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a metropolitan area network, a telephone network, a private network, the Internet, and/or the like, and/or a combination of these or other types of networks. The network 220 enables communication among the devices of environment 200.

The client device 230 includes one or more devices capable of receiving, generating, storing, processing, and/or providing information associated with application execution on a virtual server based on a key assigned to a virtual network interface, as described elsewhere herein. The client device 230 may include a communication device and/or a computing device. For example, the client device 230 may include a wireless communication device, a phone such as a smart phone, a mobile phone or a video phone, a user equipment, a laptop computer, a tablet computer, a desktop computer, a television, a gaming console, or a similar type of device.

The application licensor system 240 includes one or more devices capable of receiving, generating, storing, processing, providing, and/or routing information associated with application execution on a virtual server based on a key assigned to a virtual network interface, as described elsewhere herein. The application licensor system 240 may include a communication device and/or a computing device. For example, the application licensor system 240 may include a server, such as an application server, a client server, a web server, a database server, a host server, a proxy server, a virtual server (e.g., executing on computing hardware), or a server in a cloud computing system. In some implementations, the application licensor system 240 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
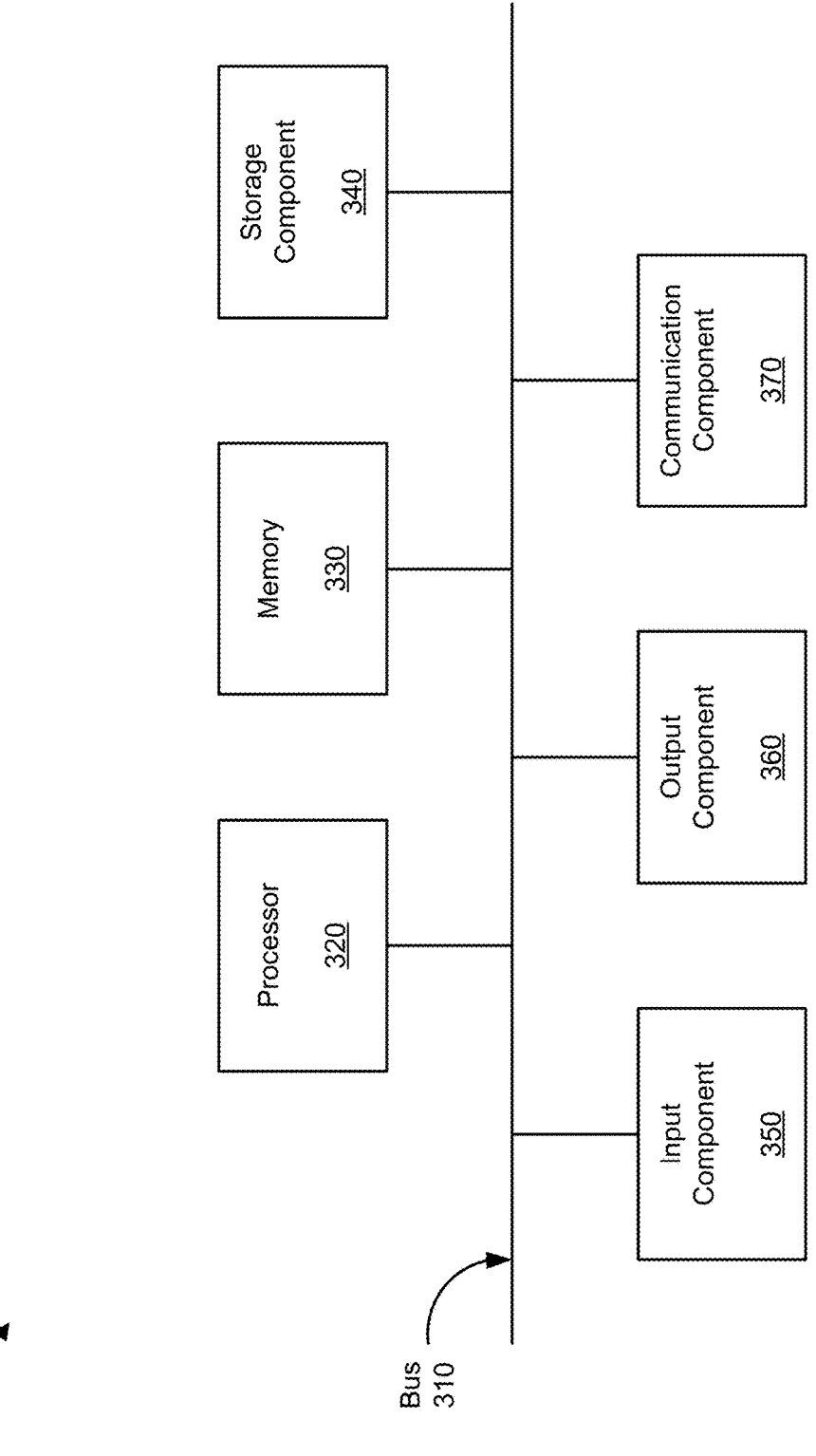
FIG. 3 is a diagram of example components of one or more devices of FIG. 2.

FIG. 3 is a diagram of example components of a device 300, which may correspond to the cloud computing system 202, the client device 230, and/or the application licensor system 240. In some implementations, the client device 230, and/or the application licensor system 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 400 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 400 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with application execution on a virtual server based on a key assigned to a virtual network interface. In some implementations, one or more process blocks of FIG. 4 may be performed by a cloud computing system (e.g., cloud computing system 202). In some implementations, one or more process blocks of FIG. 4 may be performed by another device or a group of devices separate from or including the cloud computing system, such as client device 230, and/or application licensor system 240. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include deploying a virtual server in a cloud computing system to execute an application associated with an application licensor system (block 410). The cloud computing system includes a plurality of virtual servers. As further shown in FIG. 4, process 400 may include identifying a virtual network interface that corresponds to the virtual server (block 420). As further shown in FIG. 4, process 400 may include associating a key received from the application licensor system to the virtual network interface to allow the application to be executed based on the virtual network interface (block 430). As further shown in FIG. 4, process 400 may include associating the virtual server and the virtual network interface (block 440). An association between the virtual server and the virtual network interface prevents other virtual servers, of the plurality of virtual servers in the cloud computing system, from executing the application using the key. As further shown in FIG. 4, process 400 may include executing the application on the virtual server based on the key that is associated with the virtual network interface and based on associating the virtual server and the virtual network interface (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for executing an application associated with an application licensor system on a virtual server, the system comprising:

one or more memories; and one or more processors, coupled to the one or more memories, configured to:

receive, from a client device, a request to create a plurality of virtual network interfaces in a cloud computing system, wherein the request indicates customer accounts, geographic regions, and portions of the geographic regions to be associated with the plurality of virtual network interfaces, wherein the portions of the geographic regions correspond to sets of servers in a data center;

create the plurality of virtual network interfaces in the cloud computing system based on the request, wherein the plurality of virtual network interfaces are associated with a corresponding plurality of hardware identifiers, wherein the corresponding plurality of hardware identifiers are different from each other;

receive, from the application licensor system, an indication that a same key has been assigned to each of the plurality of virtual network interfaces, wherein the key is a licensing key that is based on the corresponding plurality of hardware identifiers of the plurality of virtual network interfaces;

receive an instruction to deploy the virtual server in the cloud computing system to execute the application associated with the application licensor system;

determine metadata associated with the virtual server, wherein the metadata indicates a customer account associated with the virtual server, a geographic region associated with the virtual server, and a portion of the geographic region associated with the virtual server;

determine a virtual network interface, of the plurality of virtual network interfaces, that corresponds to the virtual server based on a correlation between the customer account associated with the virtual server, the geographic region associated with the virtual server, the portion of the geographic region associated with the virtual server, a customer account associated with the virtual network interface, a geographic region associated with the virtual network interface, and a portion of the geographic region associated with the virtual network interface;

associate the virtual server with the virtual network interface based on determining that the virtual network interface corresponds to the virtual server, wherein associating the virtual server with the virtual network interface prevents one or more other virtual servers in the cloud computing system from executing the application using the key; and execute the application on the virtual server, using the key that is associated with the virtual network interface, based on associating the virtual server with the virtual network interface, wherein the key is independent of a hardware identifier associated with the virtual server.

2. The system of claim 1, wherein the one or more processors, when determining the virtual network interface that corresponds to the virtual server, are configured to:

transmit, to a data retrieval service, a query that includes the metadata indicating the customer account associated with the virtual server, the geographic region associated with the virtual server, and the portion of the geographic region associated with the virtual server; and receive, from the data retrieval service, a query response indicating that the virtual network interface corresponds to the virtual server based on the correlation between the customer account associated with the virtual server, the geographic region associated with the virtual server, the portion of the geographic region associated with the virtual server, the customer account associated with the virtual network interface, the geographic region associated with the virtual network interface, and the portion of the geographic region associated with the virtual network interface.

3. The system of claim 1, wherein the one or more processors, when creating the plurality of virtual network interfaces, are configured to:

create individual virtual network interfaces for each combination of the customer accounts, the geographic regions, and the portions of the geographic regions; and wherein the key is associated with the plurality of virtual network interfaces.

4. The system of claim 1, wherein the virtual server is a first virtual server, and the one or more processors are further configured to:

initiate a shutdown of the first virtual server in the cloud computing system;

disassociate the first virtual server from the virtual network interface;

determine to deploy a second virtual server in the cloud computing system; and associate the second virtual server to the virtual network interface based on the second virtual server being deployed in the geographic region associated with the virtual network interface and the portion of the geographic region associated with the virtual network interface, and based on the second virtual server being deployed using the customer account associated with the virtual network interface.

5. The system of claim 4, wherein the shutdown of the first virtual server and a deployment of the second virtual server is based on a periodic refresh of the first virtual server.

6. The system of claim 4, wherein the shutdown of the first virtual server and a deployment of the second virtual server is based on one or more of a hardware upgrade or a software update of the first virtual server.

7. The system of claim 4, wherein the one or more processors, when executing the application, are configured to:

execute the application on the first virtual server based on the key that is associated with the virtual network interface; and execute the application on the second virtual server, after the first virtual server is shut down, based on the key that is associated with the virtual network interface.

8. A method, comprising:

receiving, from a client device, a request to create a plurality of virtual network interfaces in a cloud computing system, wherein the request indicates customer accounts, geographic regions, and portions of the geographic regions to be associated with the plurality of virtual network interfaces, wherein the portions of the geographic regions correspond to sets of servers in a data center;

creating, by a device, the plurality of virtual network interfaces in the cloud computing system based on the request, wherein the plurality of virtual network interfaces are associated with a corresponding plurality of hardware identifiers, wherein the corresponding plurality of hardware identifiers are different from each other;

receiving, from an application licensor system, an indication that a same key has been assigned to each of the plurality of virtual network interfaces, wherein the key is a licensing key that is based on the corresponding plurality of hardware identifiers of the plurality of virtual network interfaces;

receiving, by the device, an instruction to deploy a virtual server in the cloud computing system to execute an application associated with the application licensor system;

determining, by the device, metadata associated with the virtual server, wherein the metadata indicates a customer account associated with the virtual server, a geographic region associated with the virtual server, and a portion of the geographic region associated with the virtual server;

determining, by the device, a virtual network interface, of the plurality of virtual network interfaces, that corresponds to the virtual server based on a correlation between the customer account associated with the virtual server, the geographic region associated with the virtual server, the portion of the geographic region associated with the virtual server, a customer account associated with the virtual network interface, a geographic region associated with the virtual network interface, and a portion of the geographic region associated with the virtual network interface;

associating, by the device, the virtual server with the virtual network interface based on determining that the virtual network interface corresponds to the virtual server, wherein associating the virtual server with the virtual network interface prevents one or more other virtual servers in the cloud computing system from executing the application using the key; and executing, by the device, the application on the virtual server, using the key that is associated with the virtual network interface, based on associating the virtual server with the virtual network interface, wherein the key is independent of a hardware identifier associated with the virtual server.

9. The method of claim 8,
wherein determining the virtual network interface that corresponds to the virtual server comprises:
   transmitting, to a data retrieval service, a query that includes the metadata indicating the customer account associated with the virtual server, the geographic region associated with the virtual server, and the portion of the geographic region associated with the virtual server; and
   receiving, from the data retrieval service, a query response indicating that the virtual network interface corresponds to the virtual server based on the correlation between the customer account associated with the virtual server, the geographic region associated with the virtual server, the portion of the geographic region associated with the virtual server, the customer account associated with the virtual network interface, the geographic region associated with the virtual network interface, and the portion of the geographic region associated with the virtual network interface.

10. The method of claim 8,
wherein creating the plurality of virtual network interfaces comprises:
   creating individual virtual network interfaces for each combination of the customer accounts, the geographic regions, and the portions of the geographic regions indicated in the request; and
wherein the key is associated with the plurality of virtual network interfaces.

11. The method of claim 8,
wherein the virtual server is a first virtual server, and the method further comprising:
   initiating a shutdown of the first virtual server in the cloud computing system;
   disassociating the first virtual server from the virtual network interface;
   determining to deploy a second virtual server in the cloud computing system; and
   associating the second virtual server to the virtual network interface based on the second virtual server being deployed in the geographic region associated with the virtual network interface and the portion of the geographic region associated with the virtual network interface, and based on the second virtual server being deployed using the customer account associated with the virtual network interface.

12. The method of claim 11,
wherein the shutdown of the first virtual server and a deployment of the second virtual server is based on a periodic refresh of the first virtual server.

13. The method of claim 11,
wherein the shutdown of the first virtual server and a deployment of the second virtual server is based on one or more of a hardware upgrade or a software update of the first virtual server.

14. The method of claim 11,
wherein executing the application comprises:
   executing the application on the first virtual server based on the key that is associated with the virtual network interface; and
   executing the application on the second virtual server, after the first virtual server is shut down, based on the key that is associated with the virtual network interface.

15. A non-transitory computer-readable medium storing a set of instructions, the set of instructions comprising:
   one or more instructions that, when executed by one or more processors of a device, cause the device to:
      receive, from a client device, a request to create a plurality of virtual network interfaces in a cloud computing system, wherein the request indicates customer accounts, geographic regions, and portions of the geographic regions to be associated with the plurality of virtual network interfaces, wherein the portions of the geographic regions correspond to sets of servers in a data center;
      create the plurality of virtual network interfaces in the cloud computing system based on the request, wherein the plurality of virtual network interfaces are associated with a corresponding plurality of hardware identifiers, wherein the corresponding plurality of hardware identifiers are different from each other;
      receive, from an application licensor system, an indication that a same key has been assigned to each of the plurality of virtual network interfaces, wherein the key is a licensing key that is based on the corresponding plurality of hardware identifiers of the plurality of virtual network interfaces;
      receive an instruction to deploy a virtual server in the cloud computing system to execute an application associated with the application licensor system;
      determine metadata associated with the virtual server, wherein the metadata indicates a customer account associated with the virtual server, a geographic region associated with the virtual server, and a portion of the geographic region associated with the virtual server;
      determine a virtual network interface, of the plurality of virtual network interfaces, that corresponds to the virtual server based on a correlation between the customer account associated with the virtual server, the geographic region associated with the virtual server, the portion of the geographic region associated with the virtual server, a customer account associated with the virtual network interface, a geographic region associated with the virtual network interface, and a portion of the geographic region associated with the virtual network interface;
      associate the virtual server with the virtual network interface based on determining that the virtual network interface corresponds to the virtual server, wherein associating the virtual server with the virtual network interface prevents one or more other virtual servers in the cloud computing system from executing the application using the key; and execute the application on the virtual server, using the key that is associated with the virtual network interface, based on associating the virtual server with the virtual network interface, wherein the key is independent of a hardware identifier associated with the virtual server.

16. The non-transitory computer-readable medium of claim 15, wherein the one or more instructions, that cause the device to determine the virtual network interface that corresponds to the virtual server, cause the device to:

transmit, to a data retrieval service, a query that includes the metadata indicating the customer account associated with the virtual server, the geographic region associated with the virtual server, and the portion of the geographic region associated with the virtual server; and receive, from the data retrieval service, a query response indicating that the virtual network interface corresponds to the virtual server based on the correlation between the customer account associated with the virtual server, the geographic region associated with the virtual server, the portion of the geographic region associated with the virtual server, the customer account associated with the virtual network interface, the geographic region associated with the virtual network interface, and the portion of the geographic region associated with the virtual network interface.

17. The non-transitory computer-readable medium of claim 15, wherein the one or more instructions, that cause the device to create the plurality of virtual network interfaces, cause the device to:

create individual virtual network interfaces for each combination of the customer accounts, the geographic regions, and the portions of the geographic regions indicated in the request; and wherein the key is associated with the plurality of virtual network interfaces.

18. The non-transitory computer-readable medium of claim 15, wherein the virtual server is a first virtual server, and wherein the one or more instructions that, when executed by the one or more processors of the device, further cause the device to:

initiate a shutdown of the first virtual server in the cloud computing system;

disassociate the first virtual server from the virtual network interface;

determine to deploy a second virtual server in the cloud computing system; and associate the second virtual server to the virtual network interface based on the second virtual server being deployed in the geographic region associated with the virtual network interface and the portion of the geographic region associated with the virtual network interface, and based on the second virtual server being deployed using the customer account associated with the virtual network interface.

19. The non-transitory computer-readable medium of claim 18, wherein the shutdown of the first virtual server and a deployment of the second virtual server is based on a periodic refresh of the first virtual server.

20. The non-transitory computer-readable medium of claim 18, wherein the shutdown of the first virtual server and a deployment of the second virtual server is based on one or more of a hardware upgrade or a software update of the first virtual server.

* * * * *